United States Patent
Friedman et al.

(10) Patent No.: US 9,697,565 B2
(45) Date of Patent: Jul. 4, 2017

(54) ONLINE AUCTION SYSTEM

(71) Applicant: Ten-X, LLC, Irvine, CA (US)

(72) Inventors: Robert Friedman, Irvine, CA (US); Faramarz Farhoodi, Huntington Beach, CA (US)

(73) Assignee: Ten-X, LLC, Irvine, CA (US)

( * ) Notice: Subject to any disclaimer, the term of this patent is extended or adjusted under 35 U.S.C. 154(b) by 680 days.

(21) Appl. No.: 14/038,713

(22) Filed: Sep. 26, 2013

(65) Prior Publication Data

US 2014/0089126 A1 Mar. 27, 2014

Related U.S. Application Data

(60) Provisional application No. 61/706,097, filed on Sep. 26, 2012.

(51) Int. Cl.
| | |
|---|---|
| *G06Q 30/08* | (2012.01) |
| *G06Q 10/06* | (2012.01) |
| *G06Q 30/02* | (2012.01) |

(52) U.S. Cl.
CPC ..... *G06Q 30/08* (2013.01); *G06Q 10/063114* (2013.01); *G06Q 30/0275* (2013.01)

(58) Field of Classification Search
CPC combination set(s) only.
See application file for complete search history.

(56) References Cited

U.S. PATENT DOCUMENTS

| | | | |
|---|---|---|---|
| 7,580,870 B1 * | 8/2009 | Chang | G06Q 30/08 705/26.3 |
| 7,725,359 B1 | 5/2010 | Katzfey et al. | |
| 8,401,922 B2 * | 3/2013 | Roberts | G06Q 30/08 705/26.3 |
| 8,666,879 B1 | 3/2014 | Palumbo et al. | |
| 8,719,896 B2 * | 5/2014 | Poulsen | G06F 8/38 709/217 |
| 9,146,910 B2 * | 9/2015 | Gu | G06F 17/30873 |
| 9,374,432 B2 * | 6/2016 | Bao | H04L 67/22 |
| 2002/0103897 A1 | 8/2002 | Rezvani et al. | |
| 2002/0123959 A1 | 9/2002 | Mozley et al. | |

(Continued)

OTHER PUBLICATIONS eBay for Dummies, 8th Edition. Marsha Collier. Jan. 28, 2014.*

(Continued)

*Primary Examiner* — Peter L Ludwig
(74) *Attorney, Agent, or Firm* — Mahamedi IP Law LLP

(57) ABSTRACT

An online auction system includes a set of memory resources that store auction data and one or more processors. The one or more processors implement multiple auction forums for transacting a corresponding set of assets. The one or more processors enable a registrant to participate in any of the multiple auction forums by providing the registrant with multiple interfaces to prompt the user for input or action. In some embodiments, the one or more processors provide an entity type interface to prompt the registrant to declare an entity type of the registrant. The one or more processors operate to determine a set of requirements for the registrant based at least in part on (i) a type designation provided by the user, and (ii) a geographic region of one or more assets that are being transacted by the multiple auction forums.

14 Claims, 17 Drawing Sheets

(56) References Cited

U.S. PATENT DOCUMENTS

| | | | |
|---|---|---|---|
| 2002/0194081 A1* | 12/2002 | Perkowski | G06F 17/30879 |
| | | | 705/26.1 |
| 2003/0105674 A1 | 6/2003 | Howell et al. | |
| 2004/0220821 A1 | 11/2004 | Ericsson et al. | |
| 2005/0033683 A1 | 2/2005 | Sacco et al. | |
| 2005/0289042 A1 | 12/2005 | Friesen | |
| 2006/0287966 A1 | 12/2006 | Srinivasaraghavan et al. | |
| 2007/0174171 A1* | 7/2007 | Sheffield | G06Q 40/04 |
| | | | 705/37 |
| 2008/0097809 A1 | 4/2008 | Stroman et al. | |
| 2009/0172021 A1* | 7/2009 | Kane | G06F 17/30873 |
| 2010/0100522 A1 | 4/2010 | Allison et al. | |
| 2012/0102573 A1 | 4/2012 | Spooner et al. | |
| 2012/0116873 A1* | 5/2012 | Damm | G06Q 30/02 |
| | | | 705/14.49 |
| 2012/0254074 A1 | 10/2012 | Flinn et al. | |
| 2013/0054513 A1* | 2/2013 | Jones | G06Q 30/08 |
| | | | 707/607 |
| 2014/0025592 A1 | 1/2014 | Wright et al. | |

OTHER PUBLICATIONS eBay: The Missing Manual. Nancy Conner. Aug. 25, 2005.*
Foreclosure Radar, Jan. 2010-Jan. 2012. ForeclosureRadar.com accessed through the Internet Archive WaybackMachine. <https://web.archive.org/web/20100114032253/http://www.foreclosureradar.com> Accessed Nov. 24, 2014.
Auction.com, Dec. 2010-Sep. 2011. Auction.com accessed through the Internet Archive WaybackMachine. <https://web.archive.org/web/20101223120410/https://www.auction.com/login.php?back=/emailPage.php> Accessed Nov. 24, 2014.
International Search Report and Written Opinion mailed Aug. 15, 2014, Application No. PCT/US2013/062060, 10 Pages.

* cited by examiner

ONLINE AUCTION SYSTEM

RELATED APPLICATIONS

This application claims benefit of priority to Provisional U.S. Patent Application No. 61/706,097, filed Sep. 26, 2012; the aforementioned priority application being hereby incorporated by reference in its entirety for all purposes.

TECHNICAL FIELD

Embodiments described herein relate generally to a system and method for providing an online auction system.

BACKGROUND

With the advance of the Internet, the business of online auctions has expanded considerably. Numerous online auction forums exist that enable consumers and sellers to transact for various kinds of items, such as collectibles, electronics and other goods or services.

SUMMARY

According to an embodiment, an online auction system includes a set of memory resources that store auction data and one or more processors. The one or more processors implement multiple auction forums for transacting a corresponding set of assets. The one or more processors enable a registrant to participate in any of the multiple auction forums by providing the registrant with multiple interfaces to prompt the user for input or action. In some embodiments, the one or more processors provide an entity type interface to prompt the registrant to declare an entity type of the registrant. The one or more processors operate to determine a set of requirements for the registrant based at least in part on (i) a type designation provided by the user, and (ii) a geographic region of one or more assets that are being transacted by the multiple auction forums. Additionally, the one or more processors provide a series of interfaces to the registrant that specify at least one of an action or response from the user for complying with one or more of the requirements in the set of requirements.

In some embodiments, the one or more processors determine the set of requirements based at least in part on a set of laws pertinent to the geographic region of the one or more assets.

Still further, in some embodiments, the one or more processors provide an interface to enable the registrant to select whether the registrant is participating as a bidder or as a seller.

Still further, in some embodiments, the one or more processors determine the set of requirements based at least in part on whether the registrant is to participate as the bidder or as the seller.

Still further, in some embodiments, one or more processors implement a tree decision making process in which a given interface in the series of interfaces is selected for the registrant based on a response or action of the registrant to a prior interface in the series.

In some variations, the set of requirements include statutory requirements pertaining to transacting real property items in the geographic region where the real property items are located.

Additionally, the entity type can correspond to an individual or to one or more legally-defined entities.

In some variations, the one or more processors operate to define a set of roles, including at least a seller role and a bidder role. Each role may include a set of permissions that define what actions a registrant of that role can perform in connection with the multiple auction forums.

Still further, the one or more roles may assign a role to the registrant based at least in part on the entity type of the registrant. Additionally, the one or more processors assign a role to the registrant based at least in part on a response from the registrant to a prompt included in one or more of the interfaces in the series.

According to an embodiment, an online auction system includes a set of memory resources that store auction data, and one or more processors that implement multiple instances of a set of logical components. The set of logical components concurrently and independently provide multiple auction services. Each instance of the logical components provides one of multiple auction services by performing operations that include: (i) receiving information from a seller that identifies an asset for auctioning; (ii) standardizing the information provided by the seller; (iii) verifying that the asset can be auctioned based on the information provided by the seller; (iv) storing at least the standardized information as auction data with the set of memory resources; and (v) associating, in the set of memory resources, one of a plurality of auction states with the information stored for each asset. In variations, the plurality of auction states includes a pre-auction state which identifies the asset prior to being auctioned, an auction in progress state in which an auction for the asset is being conducted, and a post-auction state in which the auction for the asset is complete. Information about the asset is provided for viewing and searching for a population of potential bidders when the asset is in the pre-auction state. The auction can be implemented for the asset when the asset is in the auction in progress state. In this way, the multiple auction services can include a first auction service hosted from a first domain by a first host and a second auction service hosted from a second domain by a second host.

In variations, the one or more processors store standardized auction information that is received through implementation of a first instance of the set of logical components in a first partition of the memory resources, and standardized auction information received through implementation of a second instance of the set of logical components in a second partition of the memory resources.

In variations, the one or more processors generate one or more of the multiple instances in response to a request from a third-party auction host.

In some variations, the one or more processors dynamically adjust an amount of processing resources from the one or more processors for providing one or more of the multiple instances of logical components based on a demand level of each of the multiple auction services.

In some variations, the demand level includes an activity level of each of the multiple auction services.

Still further, in some variations, the one or more processors concurrently and independently provide multiple auction services by branding each auction for a different auction provider.

Still further, the one or more processors concurrently and independently provide multiple auction services by hosting each of the multiple auction services on a different domain.

In variations, the one or more processors concurrently and independently provide multiple auction services by retrieving auction data from a first auction host. The one or more processors physically and logically partitioning the memory resources based at least in part on the auction data from the first auction host.

In some variations, the one or more processors physically partition the set of memory resources so that at least a first portion of the set of memory resources is dedicated for only the first auction service and the second portion of the set of memory resources is dedicated only for the second auction services.

Additionally, in some variations, the one or more processors implement the auction for the first auction service under a first set of auction rules, and implement the auction for the second auction service under a second set of auction rules.

Still further, in some variations, the asset corresponds to a real property item, and the one or more processors standardize the information by determining a type for the seller. In some variations, the one or more processors standardize a format of the address for the real property item. Additionally, the one or more processors verify the information by verifying an address for the real property item. In other variations, the one or more processors determine a name of an owner for the real property item from an independent source other than the seller.

Some embodiments provide for tracking assets in an online auction environment. A presentation is generated that includes a first set of entries. Each entry of the first set identifies an auction that is in-progress for a corresponding asset. Additionally, each entry provides auction information that includes (i) an asset identifier for the corresponding asset, (ii) a time remaining before the auction for the corresponding asset ends, (iii) an indicator as to whether a reserve price has been met for the auction of the corresponding asset, and (iv) an indication of the highest bid amount for the auction of the corresponding asset. The auction identified for the corresponding asset identified by each entry in the first set. The auction information for the auction of the corresponding asset identified by each entry in the first set is then updated.

In some variations, the presentation can include a table, and each entry in the first set of entries can be listed as a row in the table.

Additionally, each asset can correspond to a real property item, and the presentation can be generated by listing a street address or parcel number as the asset identifier for the corresponding asset.

The presentation can be generated to identify multiple assets of a seller, and the first set of entries can correspond to assets of the seller.

The presentation can also be generated to identify multiple assets of a user, and the first set of entries can correspond to assets that are identified as being of interest to the seller.

In some variations, an online auction system includes a set of memory resources that store auction data, and one or more processors that use the auction data to provide multiple web pages for conducting auctions for a corresponding set of assets; embed code logic into a link provided with one or more of the multiple web pages, the code logic being associated with a set of rules; and in response to selection of the link, select a workflow based on one or more rules in the set of riles, the selected workflow managing a plurality of activities for the user in participating in one or more auctions.

BRIEF DESCRIPTION

DETAILED DESCRIPTION

Figure 1:
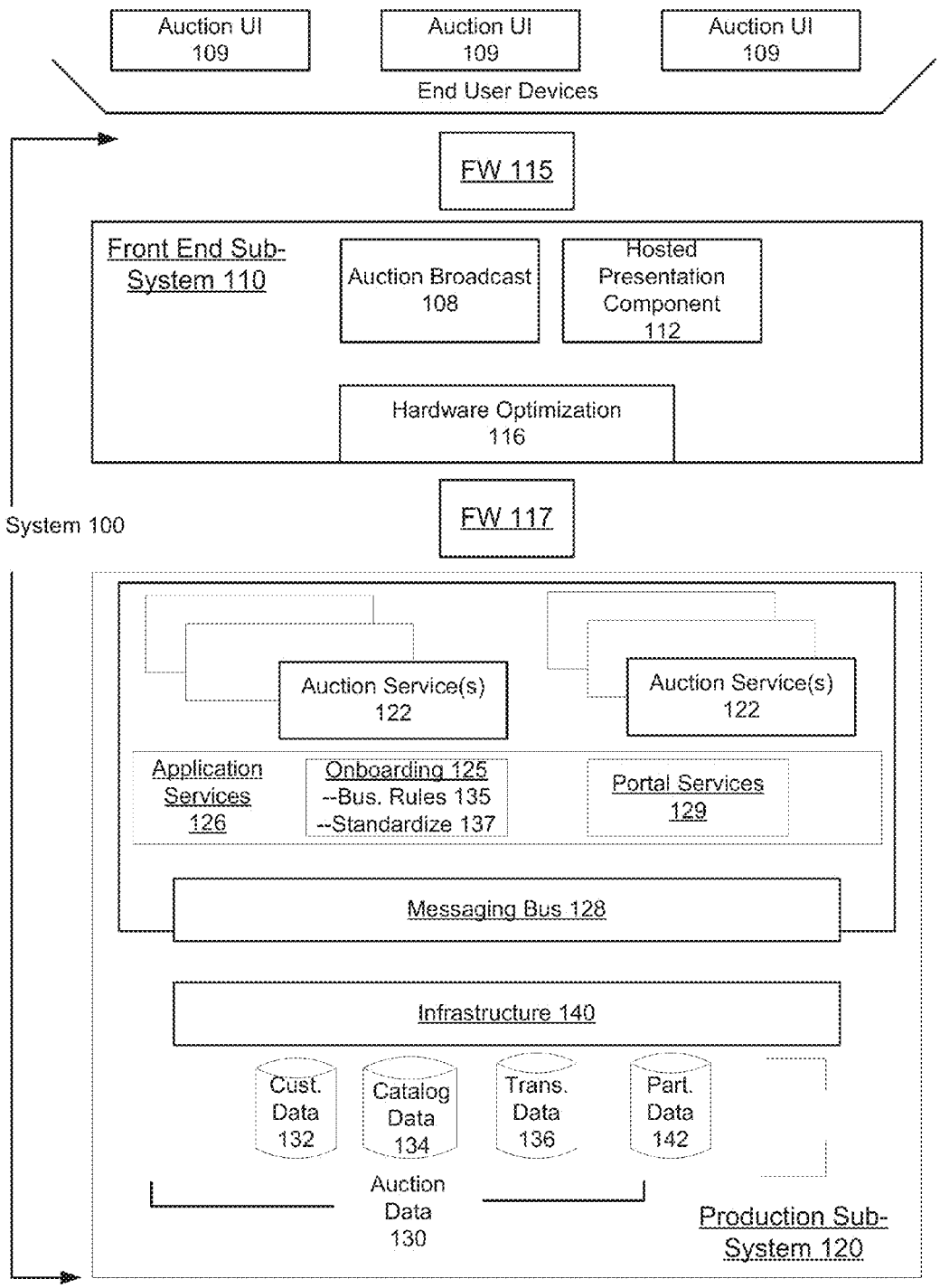
FIG. 1 illustrates a system for providing real-time, network-based (e.g., online) auctions, according to one or more embodiments.

Some embodiments provide an online auction system in which a participant is qualified as a registrant for the auction based on various legal or best-practice requirements.

A registrant can correspond to an individual or other entity (e.g., legal entity). Requirements for enabling the registrant to participate in an online auctions (or to transact for the assets) can be determined by a geographic region of the assets, as well as by the registrant's entity type.

According to some embodiments, an interactive computing environment provides various online auction services, such as auction services for transacting real-property. In some embodiments, the computing environment is partitioned into a first partition comprising a set of interactive services and data, and into a second partition comprising a second set of interactive services.

In some variations, the resources needed for at least the first or second partition can be determined and provided automatically.

In variations, the resources can be dynamically adjusted to either the first partition or the second partition automatically.

Some embodiments described herein relate to the auctioning of real-estate. Embodiments recognize that transactions for real estate post several challenges. Among the challenges, embodiments recognize that real estate has numerous statutory requirements before it can be transacted. For example, unlike consumer electronics or goods, a seller cannot just decide to upload images and description for real estate property before there is a transaction. Still further, estate transactions often require various verifications, including (i) verification of a property that is to be sold, (ii) verification that the seller owns the property in question, and (iii) verification that the buyer has funds to purchase the property. Furthermore, numerous types of transactions exist for purchasing real estate, such as trustee auctions, foreclosure sales (e.g., seller is financial institution), short sales (seller is owner, subject to financial institution approval), escrow sales, or consumer to consumer transactions. Each type of transaction may require its own set of considerations or limitations. When real-property transactions are conducted online, embodiments recognize that different requirements may be needed based on the type of real-property transaction (e.g., trustee-sale, foreclosure, short-sale, consumer sale, etc.).

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Auction Architecture

FIG. 1 illustrates a system for providing real-time, network-based (e.g., online) auctions, according to one or more embodiments. An example system of FIG. 1 illustrates a layered architecture for enabling scalability, partitioning, and extensibility, among other benefits. Examples such as described with FIG. 1 can support multiple presentation types utilizing a common underlying application, infrastructure and data. Additionally, the underlying location, resources, and technology of the system 100 may be made transparent to the users of the auction system. Furthermore, multiple classes of users can be provided for with a system such as shown by FIG. 1. In particular, system 100 can be made available for use by buyers, sellers, specialized vendors or users (e.g., realtors, investment entities, commercial entities etc.). Additionally, system 100 can be partitioned to system-level customers or users who can segment resources of system 100 for hosting auctioning services independent of other customers or users. These and other benefits are described in greater detail below.

According to some embodiments, system 100 includes front end subsystem 110 and production subsystem 120. From the perspective of hardware, the front end subsystem 110 can reside behind a first firewall 115, and comprise multiple Web servers that handle requests from users, such as buyers or viewers of auctions. Each Web server can, for example, comprise one or more processors, memory resources, and network communication resources. The production subsystem 120 includes processes that communicate with and provide functionality to the front end subsystem 110. The production subsystem 120 can reside behind a second firewall 117, and include numerous services that enable multiple auction processes, including processes for enabling a seller to submit a transaction item, processes for enabling the transaction item to be vetted and prepared for sale, and processes for enabling the transaction item to be auctioned. If an auction results in a sale, the system 100 can facilitate other processes for enabling the transaction to close.

In more detail, front end subsystem 110 includes components such as auction broadcast interface 108, hosted presentation component 112, and hardware optimization components 116. The auction broadcast interface 108 relays auction data from the production subsystem 120 to the auction UI 109 (which can run on an end user device, such as through web browser or web application). The information provided through the auction broadcast interface 108 can provide the auction UI 109 with the ability to display transaction items that are being auctioned in a variety of states (ongoing auction, auction preview, auction close, historical, etc.). The auction UI 109 can displays state information for an item that is being auctioned in real-time. The front end subsystem 110 can include additional components, such as a catalog interface to enable users to search and discover assets that are (or will be) auctioned.

On the front end subsystem 110, the hosted presentation component 112 can provide a version of the auction broadcast interface 108, configured with parameters, content and data that is provided from a third-party auction provider (see white-labeling, below). Case-specific variations may exist between the hosted presentation component 112 and the auction broadcast interface 108. For example, variations (as specified by alternative auction providers) can exist in the rules of the auction, the skins or content generated for each auction, the branding, etc. As described below, hosted auctions can utilize partitioned versions of services provided in the production subsystem 120.

Optionally, the hardware optimization components 116 can include a file server for serving images, documents and other flat files, and a cache for enhancing presentation of cacheable content (e.g., live auction event).

The production subsystem 120 can include multiple versions of components for providing auction services 122, as well as application services 126 that support the components of the auction services. The application services 126 can include components that facilitate use of auction services by the user base. In an example of FIG. 1, the application services 126 include on-boarding component 125 and portal services 129.

According to some embodiments, the production subsystem 120 can access or use auction data 130. The auction data 130 can be maintained in one or more databases, and can include customer data 132, catalog data 134, and/or transaction data 136. The transaction data 136 can include state information for particular auctions, including maintaining real-time information about a current bid or auction activity. The customer data 132 can include information about buyers, sellers (individuals or financial institutions), and realtors or agents were involved in the transactions. The catalog data 134 can include information that uniquely identifies items of real estate or real estate products that are auctioned (or have been auctioned) to system 100. As described in greater detail, the auction data 130 can be partitioned physically and/or logically, to support different auction providers who may utilize system 100. Partitioned data 142 can maintain customer data 132, catalog data 134 and transaction data 136 for a specific auction provider, independent of other auction data. As described in greater detail below, the partitioned data 142 can be used in connection with other processes and components of the front end subsystem 110 and production subsystem 120 that are partitioned.

The auction services 122 can implement rules for various kinds of auctions, including English style auctions and variations thereof. The auction services 122 can generate information and content for use with auction broadcast user interface 108. In one implementation, the auction services 122 use the auction data 130 to display, via the auction user interface 108, information about individual transactions, process events from potential buyers (e.g., bids), process events from sellers or trustees (e.g., suspension of auction), and enable events and sequences by which an auction transaction is initiated and closed (e.g., completed or terminated).

Various application services 126 can be provided through the production subsystem 120 to support auction services 122. The application services can include, for example, functionality for on-boarding assets (on-boarding component 125). The on-boarding process 125 includes rules 135 for on-boarding assets, rules that are specific to different types of assets, and rules for on-boarding assets for different types of auctions. Among the functionality that is performed, the on-boarding process 125 can include processes to (i) standardize 137 information provided by a seller, (ii) identify the asset that is being submitted for auctioning (e.g., unique address), and/or (iii) verify information about the seller, including that the seller is the title owner or has authority to submit the asset for auctioning. Other examples of application services 126 can include programmatic bidding (e.g., programmatic personas that act as virtual bidders), bidder verification, dashboard interfaces for auction operators, sellers, brokers and/or bidders, etc.

Still further, the application services 126 can include portal services 129. The portal services 129 can be provided for the various entities that utilize system 100. These can include, for example, sellers, buyers, and other interested participants. For real estate, the various parties can include individuals, institutions (e.g. banks), realtors, etc. An example of a seller portal is illustrated below.

According to one or more embodiments, the various components of the production subsystem 120 and front end subsystem 110 communicate using a messaging bus 128. The individual components of system 100 may each be configured to detect specific events for that component or application. The individual components of system 100 respond to events by generating messages that are either (i) queued and made available for detection by another component, or (ii) transmitted to a designated component, depending on the event. The use of messaging bus 128 enables scalability and partitioning of services, particularly as to labeling and versioning.

In one embodiment, the messaging bus 128 is initiated for auctions. Once initiated, the messaging bus listens for events processed through the front end subsystem 110 and the production subsystem 120. The events can include bids, auction terminations (by seller), and intra-programmatic events (e.g., monitoring health of system).

Various infrastructure services 140 may also be included in the system 100. Infrastructure services 140 can implement, for example, monitors to check component health, provide operating system and management, and provide database management. In one embodiment, the infrastructure services includes a health monitor which continuously monitors the use of the various components that comprise system 100. In particular, each component of system 100 can include a keep alive element which periodically logs a signal establishing that component as being 'alive' or working. The health monitor can check the logs of each component. If the log of one component is delinquent in logging the 'alive' signal (e.g., last signal was reached at some time that exceeds a threshold), it generates an administrator notification that informs the administrator of the potential failure. Remedial measures may be taken. For example, another instance of a failed component being taken online or other autonomic system response may be implemented as a remedial measure.

Hosted Auctions

Services for enabling hosted auctions, sometimes referred to as "white labeling" can utilize replication of services and data as described by system 100 and elsewhere in this application. Versions of processes or components described with, for example, system 100 can be generated and hosted from common set of hardware resources. The components that comprise the white label services can be partitioned for each auction host. The partitioning can be logical and/or physical. For example, auction data 130 for use of the host auction can be physically separated from other auction data in use by system 100. Likewise, the various components that comprise the auction services 122 and the auction broadcast interface 108 can be versioned and partitioned separately. This allows for the auction provider to manage an auction using, for example, their own data, interface content (e.g., skin) and on their own specific network domain.

With further reference to FIG. 1, system 100 can be implemented using multiple servers or computers that operate over a network. In operation, the system 100 can provide a technical effect, in that a real-time interactive environment is generated between system 100 and end users operating computing devices such as tablets, smart phones and desktop computers. The user interaction involved with the use of system 100 can include, for example, search and discovery operation, viewing (e.g., auction transactions), providing input (e.g., bids), and providing content or records (e.g., user submits home sale) for generating the user activity. In such computing environment, one technical effect is that multiple operation environments (e.g., auctions) can be conducted independent of one another. The databases and computing resources can be logically (and optionally physically) partitioned on-demand (e.g., in response to a request from a third-party or other auction host) to enable multiple independent interactive computing environments using a common set of computing machines (e.g., servers). For example, multiple real-time and interactive computing environments can be conducted in accordance with online marketplace rules (e.g., online auctions), and at least one of the interactive computing environments is hosted by a third-party. Data for use with the hosted environment can conform to that used by system 100, or be partitioned (physically and logically) for the hosted system. The components of the servers that are for the hosted environment can also be generated to be logically (and/or physically partitioned). The instances can use the data as part of one or more workflows for providing the online environment independently of a remainder of system 100.

Still further, as another alternative or addition, the partitioning provisions for the hosted system can be made automatically, and adjusted dynamically and automatically based on the real-time requirements of the hosted system. For example, the amount of bandwidth or server resources used to provide the instances of the online environment can be increased or decreased based on the audience or level of participation that the hosted computing environment receives.

Figure 2:
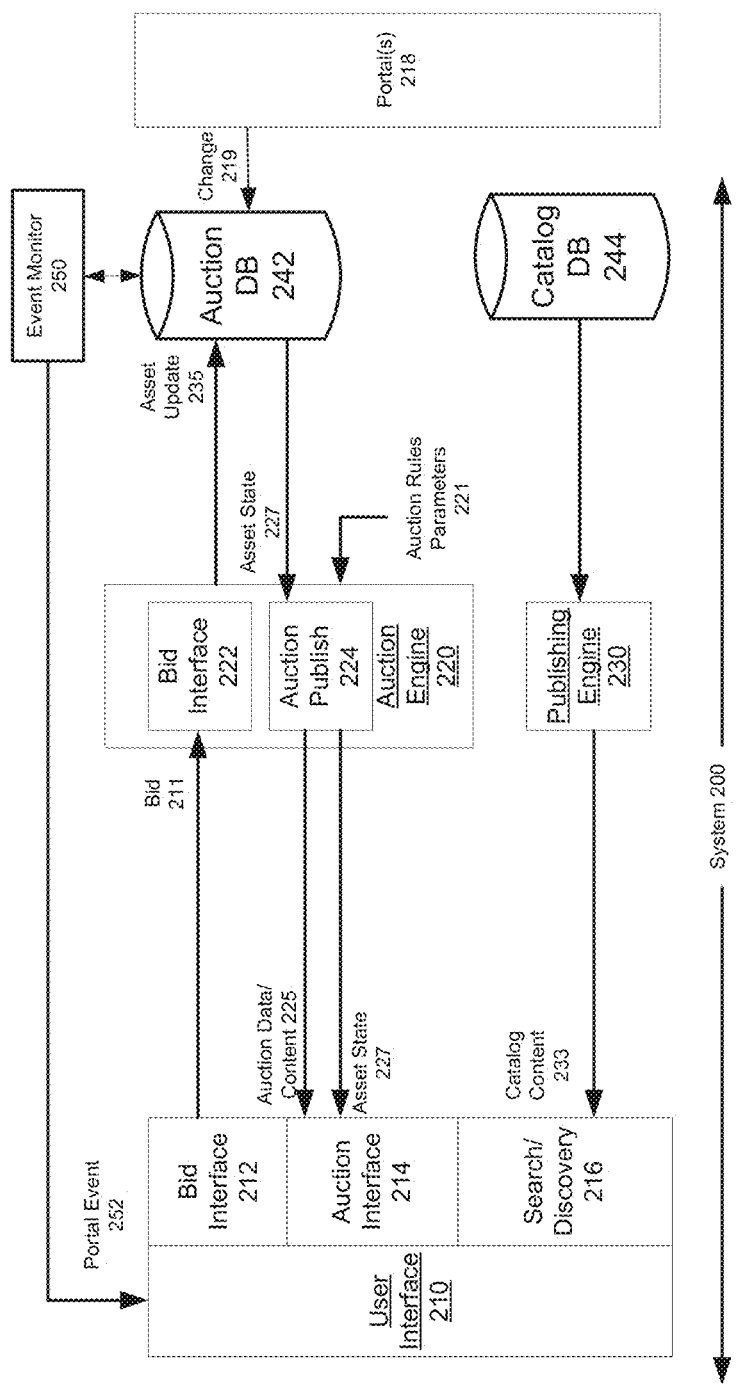
FIG. 2 is a logical illustration of an auctioning system, according to one or more embodiments.

FIG. 2 is a logical illustration of an auctioning system, according to one or more embodiments. A system 200 can be implemented in a network environment, such as on a combination of servers that communicate with terminals over the Internet. The system 200 includes user interface 210, auction engine 220, auction publishing engine 230 and databases systems 242, 244. Among other aspects, the auction engine 220 and the publishing engine 230 can be implemented on a combination of servers, and provide content and functionality corresponding to user interface 210. The user interface 210 can be rendered on individual terminals that, for example, access a particular network site. Thus, the user interface 210 can be provided as a functional web page that runs on the browsers of user devices. In variations, the user interface 210 can be provided as a client application that runs on a user device and connects to a site where system 200 is provided.

In operation, the user interface 210 includes a bid interface 212, and auction interface 214, and a search and discovery interface 216. The search and discovery interface 216 can include browsing and search features to enable a user to search for assets by various parameters, such as by geographic designation, property description, property type (e.g., commercial or residential), auction type (e.g., trustee auction, luxury auction, foreclosure auction, non-distressed auction, short sale, etc.).

The auction interface 214 can also include functionality for enabling the user to view an online auction in progress. In some variations, the auction interface 214 provides for multiple states, such as (i) a pre-auction state, (ii) an auction in progress state, and (iii) an auction closed state. In the pre-auction state, the user can preview the property before making a bid. In some variations, the pre-auction state can also enable completion of separate processes for on-boarding the asset. For example, during the pre-auction state, an asset can be identified, and the seller can be verified as being the owner of the property. During the auction-in-progress state, the bid interface 212 can be enabled. When the auction is over, the auction closed state can display whether the auction transaction was complete, as well as other information (e.g., price of sale, reserve met, etc.).

When the bid interface 212 is enabled, the user can submit a bid 211 for an asset using the bid interface 212. The bid 211 can be communicated to the auction engine 220.

The auction engine 220 implements auction rules and parameters 221 for regulating the course of events from when the auction starts until it ends. The auction engine 220 can, for example, (i) implement rules for the type of auction (e.g., English auction, blind auction), (ii) maintain timers as to where in the auction process the auction is at a given moment, (iii) implement rules as to when the auction can end (including when auctions can be extended), and (iv) implement rules as to when programmatic bidding can occur. The auction engine 220 can include components such as a bid interface 222, and an auction publishing component 224. The bid interface 222 receives and processes bids 211 received from the user interface 210 (e.g., operating on the user devices). The bid interface 222 can process the bids 211 in near real-time. In response to receiving a bid 211, one or more embodiments provide that the bid interface 222 sends an update signal 235 to the auction database 242 to update the asset receiving the bid.

The auction publishing component 224 can operate to repeatedly retrieve auction state information 227 from the auction database 242, and publish auction content 225 for individual auctions. The auction content 225 can include information corresponding to the asset states 227. When the state of an auction is updated by, for example, the bid interface 222, the asset state 227 of the particular auction is changed, and the auction publishing component 224 communicates the change in asset to the auction interface 214 running on, for example, the user devices.

Thus, in real-time, those auctions and received bids 211 are updated by the bid interface 222 in the auction database 242. The auction publishing component 224 accesses the asset states 227 of the various auctions in progress and communicates the auction states to the user interface 210. In this way, the user interface 210 is able to receive real-time auction information from the auction engine 220.

The auction publishing engine 230 can also reside on the network to publish the catalog of assets available for auction, either at the present time or in the future. The auction publishing engine 230 can publish the content 233 through the user interface 210, and enable functionality such as provided by the search and discovery component 216 of the interface 210. Historical content can also be provided, such as in the form of prior auctions or assets made available for auction. The catalog database 244 can maintain the catalog content and make it available to the auction publishing engine 230. When an asset is made live for auctioning, information about the asset can be maintained in the auction database 242.

With reference to FIG. 2, white labeling services can be provided by generating instances of the user interface 210, the auction engine 220, the auction publishing engine 230, the auction database 242, and/or catalog database 244. Logical and physical partitions can be used to maintain separation of each component from a non-hosted auction system. Thus, the inventory and catalog offer to white labeling services may vary. Likewise the auction engine 220 can be configured to implement different rule sets, including different types of auctions. The user interface 210 can also be varied, to enable, for example, alternative skins or content. The various instances of the components used for white labeling services can also be communicated for different domains, to enable an alternative auction provider to transparently host auctions for their own inventory using their own network presence (e.g., website).

Portal Services

According to some embodiments, system 200 can include a portal service layer 218. Multiple portal services can be made available to the layer 218. As examples, a seller-institution can have a first portal to monitor various assets that the seller may have available for auction at a given time; a seller-individual can have a second portal that is configured for one asset; a financial institution (e.g., the mortgage holder on a short sale) can have a third portal to monitor events in an auction. In one embodiment, the portal layer 218 enables a seller to signal a change 219 of information or parameters provided with an auction in progress. For example, a seller can change the reserve price, suspend the reserve price, or suspend the auction altogether. In some examples, the event monitor 250 can detect portal initiated changes. For example, the event monitor 250 may pull the contents of the auction database 242 in order to connect portal initiated changes. In variations, the event monitor 250 may receive communications via the portal service layer 218. The particular auction that is modified is identified. The event monitor 250 can communicate a portal event 252 corresponding to the change 219 (e.g., change of reserve price, suspend auction) to the user interface 210. In this way, an auction in progress can be affected by an event, without any discontinuation of the auction event to the participants and viewers of the auction.

Figure 3:
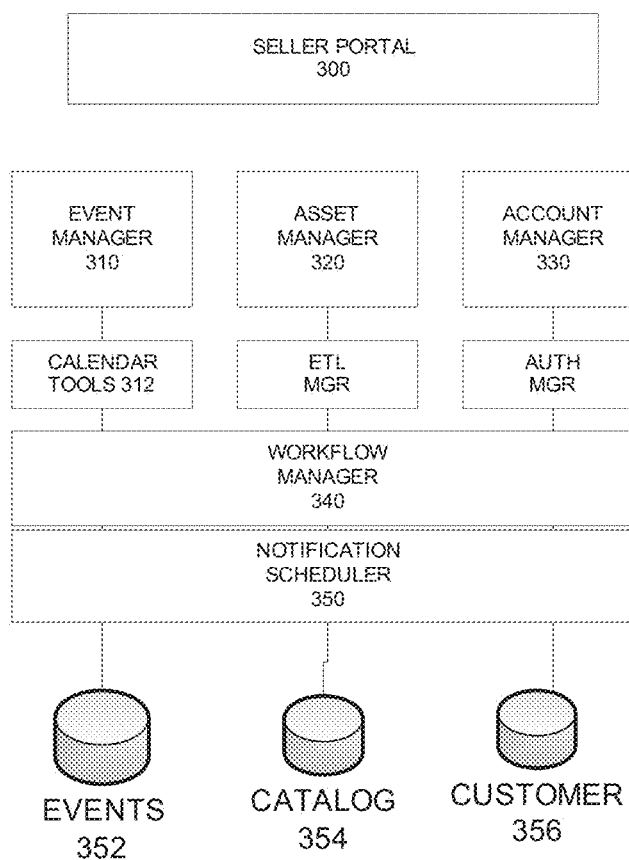
FIG. 3 illustrates a seller portal, according an embodiment.

FIG. 3 illustrates a seller portal, according an embodiment. A seller portal 300 can be provided through, for example, the portal interface layer 218. The seller portal provides various components to enable a seller (whether individual or institution) to manage their assets on the system 200. In one embodiment, the portal layer includes an event manager 310, an asset manager 320, and an account manager 330. The event manager 310 can provide calendar tools 312 for enabling the seller to schedule auctions and to view schedules. The asset manager 320 enables the seller to view information about assets he or she has specified for auction. The account manager 320 can show account information for the seller, including information that the seller and/or asset has been verified, information regarding past transactions, etc. A workflow manager 340 can be used to manage the various functions that are provided to the seller via the portal. Additionally, notification scheduler 350 can generate notifications of events, changes in assets, or count notifications. The notifications can be generated by monitoring (i) event databases 352 for transaction events (e.g., a bidder supplies a bid), (ii) catalog events 354 (e.g., change in status of a catalog asset), or (iii) customer information 356 (e.g., change in account contact).

In some embodiments, a user or buyer portal can also be provided. In a buyer portal, the user can specify information that, for example, confirms the identity of the buyer. The buyer can also specify financial information or bank account information to enable funds to be verified or validated should the buyer when an auction. The buyer can also mark as favorite specific assets or auctions, and receive automatic notifications when certain events occur regarding the favorite asset (e.g., favorite home receives a bid).

Figure 4:
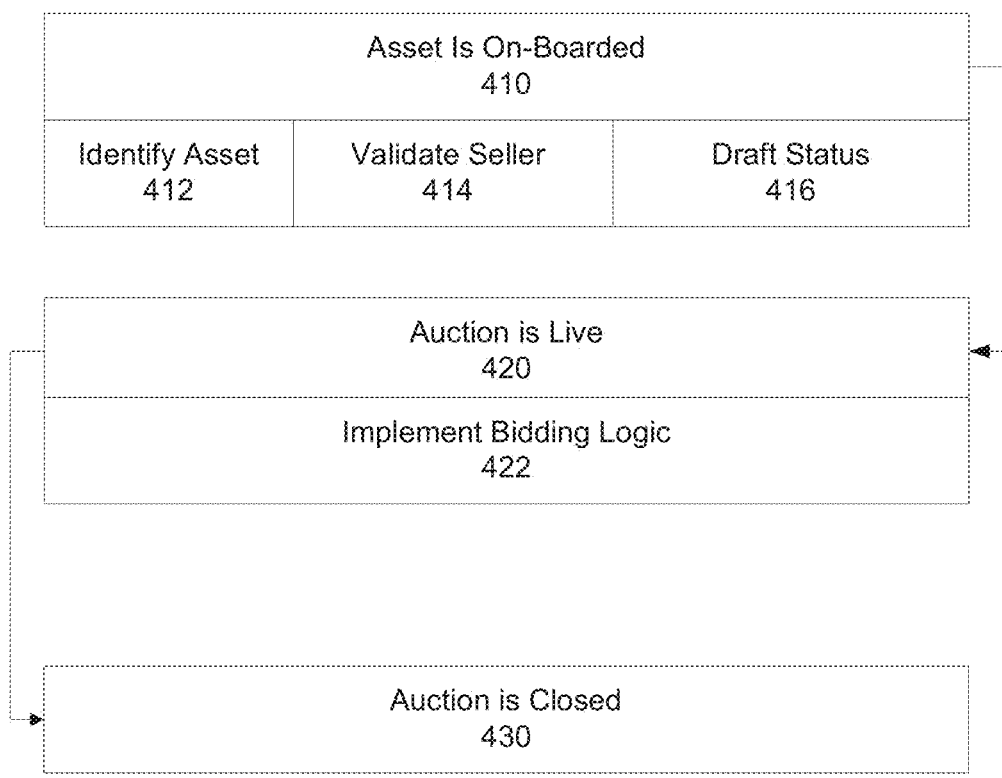
FIG. 4 illustrates a method for implementing an auction environment, according to an embodiment.

FIG. 4 illustrates a method for implementing an auction environment, according to an embodiment. A method such as described by an embodiment of FIG. 4 can be implemented using components such as described by previously described embodiments. Accordingly, reference may be made to elements of FIG. 1 through FIG. 3 for purpose of illustrating a suitable component or element for performing a step or sub step being described.

In an embodiment, an asset is on-boarded (410). When on-boarded, the asset becomes part of the inventory for auctioning. In one implementation, a seller may initiate on-boarding process using the seller interface 300. Through the interface, the seller can specify an asset (e.g., home, commercial building). In providing the input, the seller can generate a record that identifies the property (e.g., by address), as well as the seller. The seller can upload a record of the asset to the auction system 100. When uploaded, one or more processes are performed to on-board the asset. In one implementation, the type of seller is identified, and the particular process or workflow that is performed to on-board the asset is configured or tailored for the seller. For example, in a foreclosure sale, the seller is typically an institution, and the information provided from the institution is more trustworthy. In a consumer sale, the possibility of fraud or mistake is greater.

In an example shown, the on-boarding process provides for the asset to be uniquely identified (412). This step can correspond to the address or lot number of the property being identified. As an addition or variation, the on-boarding process can include determining the authority of the seller or person uploading the asset as being valid (414). For example, if the seller of the asset is a person, the seller's name may be cross-referenced to a public record repository for the title of the property, so as to ensure that the seller of the asset is also the seller on record for the property. The asset can then be listed in the online catalog. As an addition, the information provided with the asset can be standardized. For example, address information can be reformatted to enable validation, and/or display in the online catalog.

In certain types of transactions, the asset can be listed in draft status prior to publication in auction, pending approval, completeness and validation of the asset (and/or seller) (416). For example, validating the seller and obtaining information about the property can take some time (e.g., hours or days). One or more embodiments provide for listing the asset as being staged while processes of verification, standardization and on-boarding or completed. In this intermediate phase, asset is discoverable through the system 100. For example, users can perform searches that specify geographic regions or zip codes and located asset that is staged, and available soon, but not live with respect to an auction.

In some variations, the information provided from the seller can be checked. For example, the address of an asset can be checked to determine it is correctly stated. The address information can also be reformatted as needed. Additionally, the seller information can be checked to determine it is legally compliant. If the information is presented in a manner that appears incorrect, or outside of the norm, the information provided by the seller can be rejected. In some variations, if the information provided from the seller is incorrect or mis-formatted, correction can be made to reformat the information provided by the seller.

Once the on-boarding process is complete, the auction for the asset can go live (420). Optionally, different types of bidding logic may be used when the auction is live (422). Among them, bidding logic may specify the use of programmatic bidding (e.g., implemented by computer personas) that operate to raise the price of an option towards his reserve should the reserve not be met. Other bidding logic can include extending auction by several minutes if the reserve is not met, and/or extending an auction when the reserve is not met a using programmatic bidding to increase the price of the auction until the reserve is met. As an addition or alternative, implementing bidding logic can include determining bid increments based on auction activity. In particular, rules may be used to increase or decrease bidding increments based on activity during the auction. For example, the number of bids and auction receives can determine the size of the increment. Auctions with more activity can receive higher bidding increments. As another example, less activity may cause the bidding increment to decrease.

The auction may end after certain events or conditions are satisfied (430). If the reserve price is met, and there is a winner, the auction may end after a designated duration. If the reserve price is met, and the auction has received multiple bids above the reserve price, the auction may be extended so that the highest price is attained. If the reserve price is not met, the auction may be extended an estimated time to determine if the reserve price can be met. As mentioned, programmatic bidding may be used to bid up the price.

Once the auction is complete, the asset may be subjected to a closing process where the property changes ownership.

Alternatively, the asset may be returned to inventory, where it can be re-auctioned, or the asset may be returned to the source unsold.

Registration Process

The portal services 129 (see FIG. 1) can also provide for registration processes for the participants of the online auction system. In particular, embodiments recognize that real-estate assets can include laws or "best practice" (e.g., fraud protection best practice) that impose requirements (e.g., requirements for verification) of the participant or the asset. According to embodiments, system 100 can be structured to register participants prior to allowing the participants to participate in an online or auction transaction. According to some embodiments, the system 100 can detect the geographic region or locality of a participant, then identify a set of interfaces that prompt or guide the user into submitting information that is specific to the class of user (e.g., bidder or seller, individual or corporation) and/or the geographic region of the participant.

The examples shown with FIG. 5A through FIG. 5E, and FIG. 6A through FIG. 6D illustrate an example of a registration process for participants to an online auction environment (e.g., bidders or sellers). Various registration processes can be selected for bidders, sellers, or other interested parties (e.g., trustees). With reference to examples of FIG. 5A-FIG. 5E and FIG. 6A-FIG. 6D, the cumulative of the examples show a tree decision making process in which the registering participant is provided an interface for selecting a response (from a set of possible choices), and some of the interfaces presented to the user are selected based on the prior user response.

To further illustrate, embodiments recognize that for transactions in real estate, there may be several requirements that have to be met from bidders. The requirements can be legal in nature, or they may be required as a result of the nature of the transaction. Moreover the requirements can be geographic specific. For example some locations or countries can have their own requirements regarding the qualification of bidders, as well as requirements as to the need to show assets, and to the need to show that the assets were derived from qualified sources.

The portal services 129 can include a library of functions that are selected based on the geographic information of the bidder. For example, a user can be required to register as a bidder. In some jurisdictions, the bidder may identify himself but as being of a particular type of entity. The entity can correspond to an individual, or to a legally defined entity such as a corporation or partnership or variations thereof.

Based on the identification of the type by the bidder, the next interface is selected for the user in order to instruct or guide the user into providing information based on the user being of the particular type of bidder. For example the rules for corporate entity may differ from those of an individual. Moreover, the rules for different types of corporate entity may differ from one to the other. Thus the user may also have to identify himself as being of a type of entity. Once the user is identified himself as being of a type of entity, the user may need to verify his funds. The funds may also need to be demonstrated as being from a good source. Accordingly, the user may be required to for example, upload documentation or bank statements that show the funds reside with a legitimate bank.

Figure 5A:
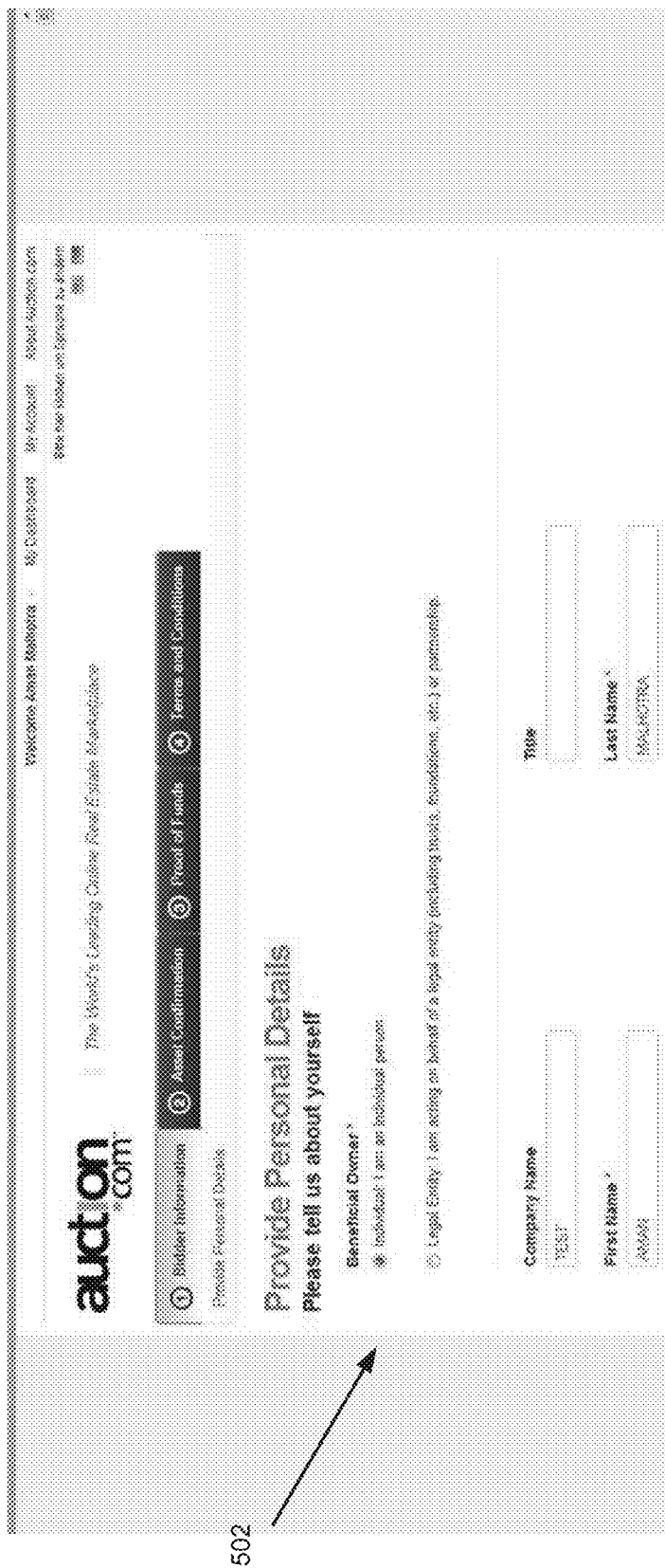
FIG. 5A through FIG. 5E illustrate a sample set of user interfaces and flow process that can be followed by an entity seeking to participate in an online action as a bidder.
Figure 5B:
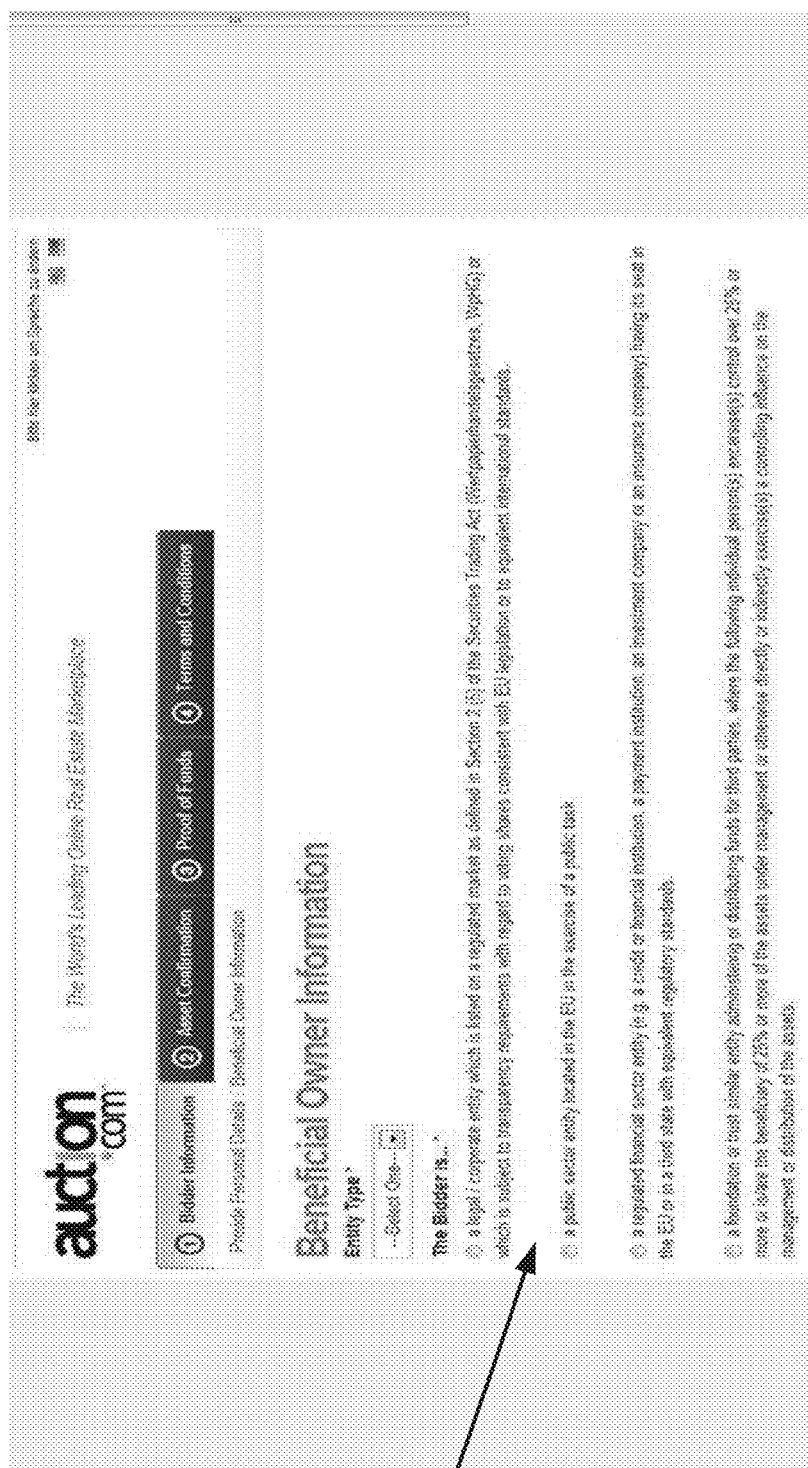
Figure 5C:
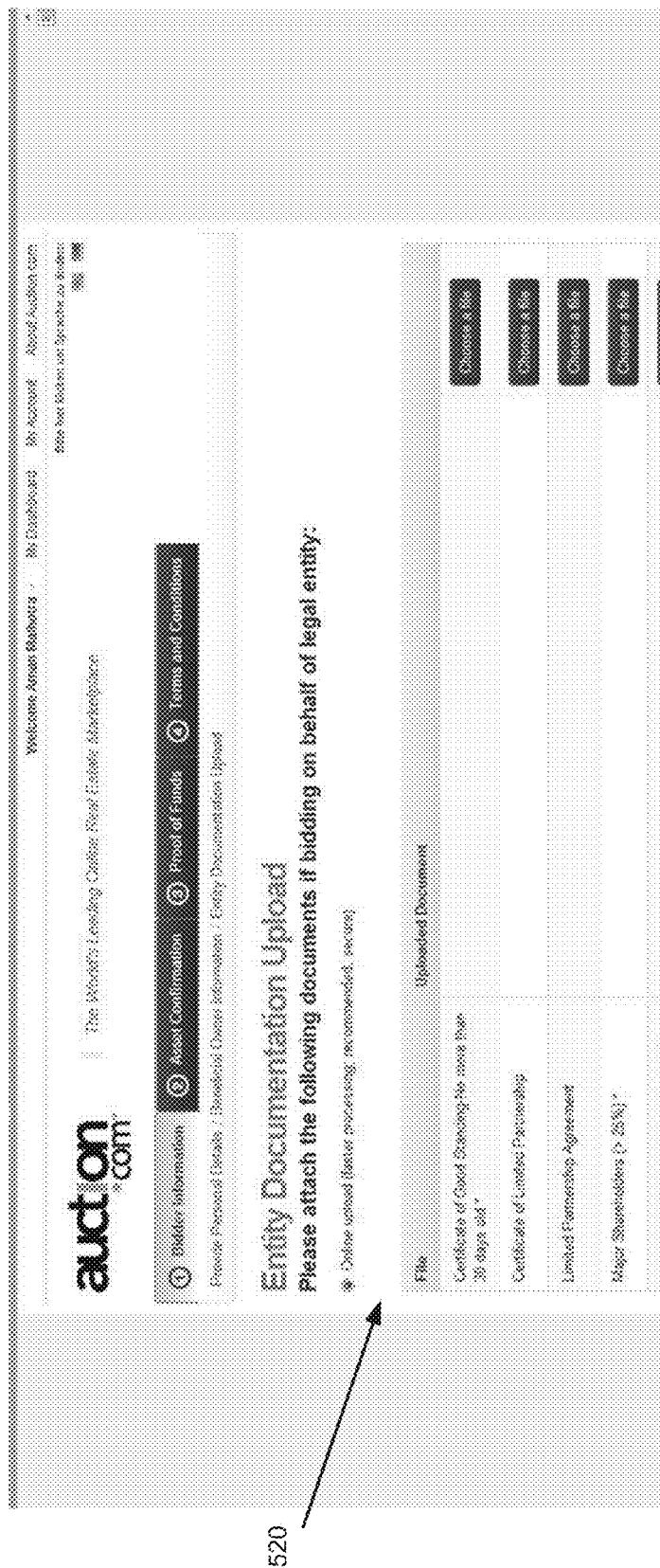
Figure 5D:
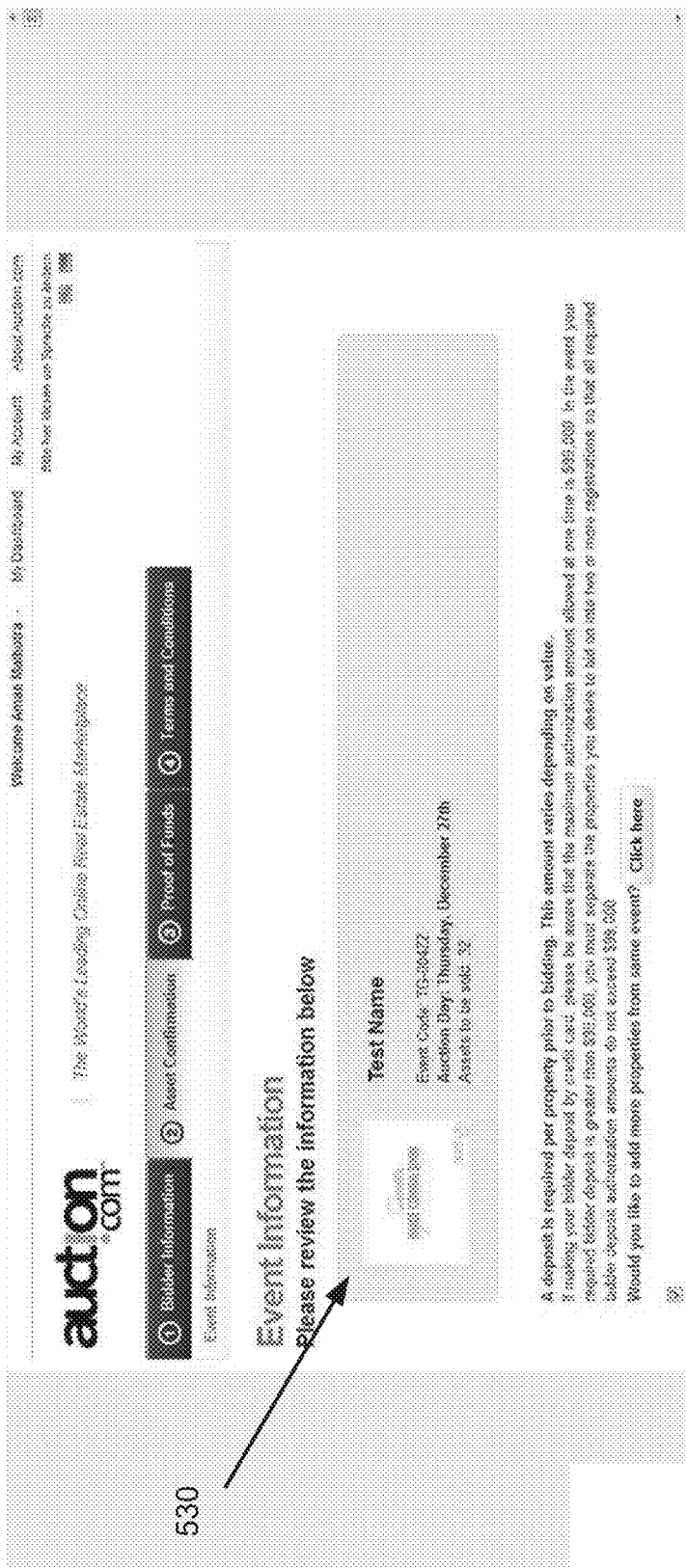
Figure 5E:
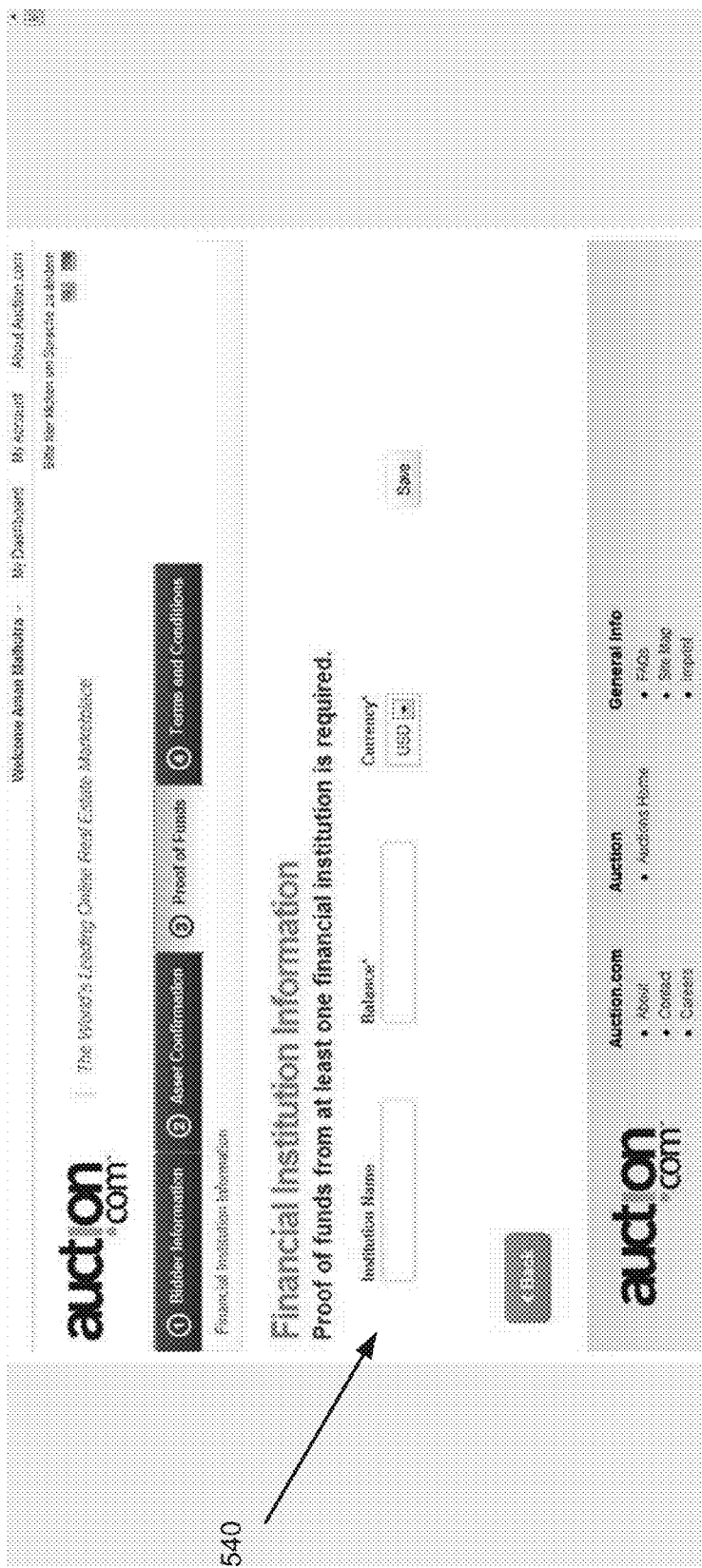

FIG. 5A through FIG. 5E illustrate a sample set of user interfaces and flow process that can be followed by an entity seeking to participate in an online action as a bidder. FIG. 5A illustrates an interface 502 in which the user (an interested participant) can initiate a registration process for either a particular auction or with the auction service (e.g., user is a registrant). In the interface 502, the user can select a general type for the entity (e.g., individual or corporate). Different requirements can be made for the individual based on the individual type. For example, FIG. 5B though FIG. 5E illustrate interfaces which prompt the registrant for requirements in the event the user selection is that of a corporate registrant. These requirements provide examples of interfaces that generate specific fields and prompts for user input as to requirements based on the type of entity the registrant is. These requirements can also be specific to location of the registrant.

In FIG. 5B, an interface 510 is displayed in which the registrant (e.g., institution) identifies it's type. The option provided to the registrant correspond to type selections for the registrant (e.g., "legal corporate entity," "public sector entity," "regulated financial entity," or "foundation or trust similar entity."). The interface 520 can be generated in response to the user input. The interface 520 shows an example of requirements that may be needed based on the input from the registrant as to the entity type. For purchasing real-estate, for example, certain requirements may be made based on the applicable laws of the jurisdiction where the property is located.

In an example of FIG. 5C, the requirements can specify documents needed, as well as specific information regarding the legal entity declared as being the registrant. FIG. 5D also illustrates another interface 530 specifying additional requirements (requirement for bidder deposit or security). The additional requirements can be location-specific and/or based on the type of registrant. Additionally, the additional requirements can be based on event information for an event of interest to the user. FIG. 5E illustrates another interface 540 with additional requirements, which can also be based in whole or in part on the type of registrant and/or the jurisdiction or location of the asset.

Figure 6A:
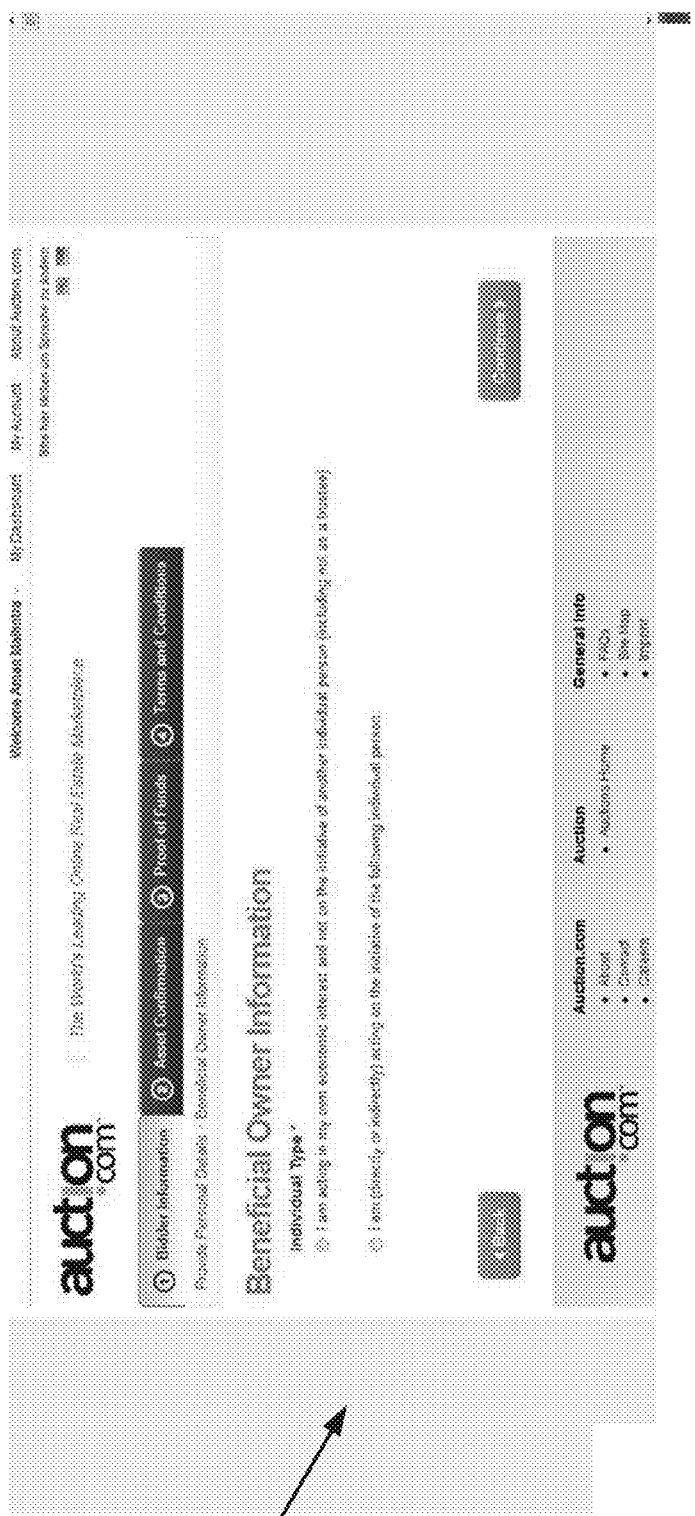
FIG. 6A through FIG. 6D illustrate a sample set of user interfaces and flow process that can be followed by a registrant that is acting as a seller.
Figure 6B:
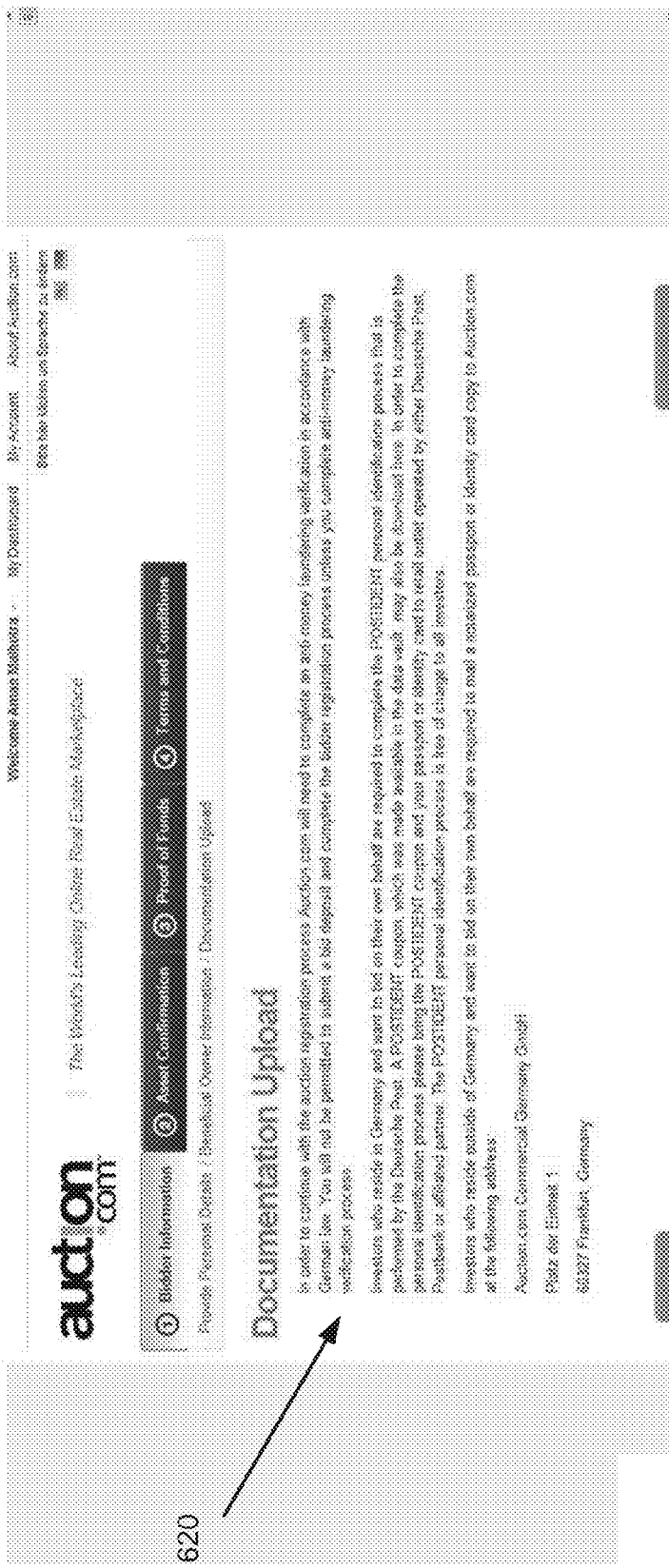
Figure 6C:
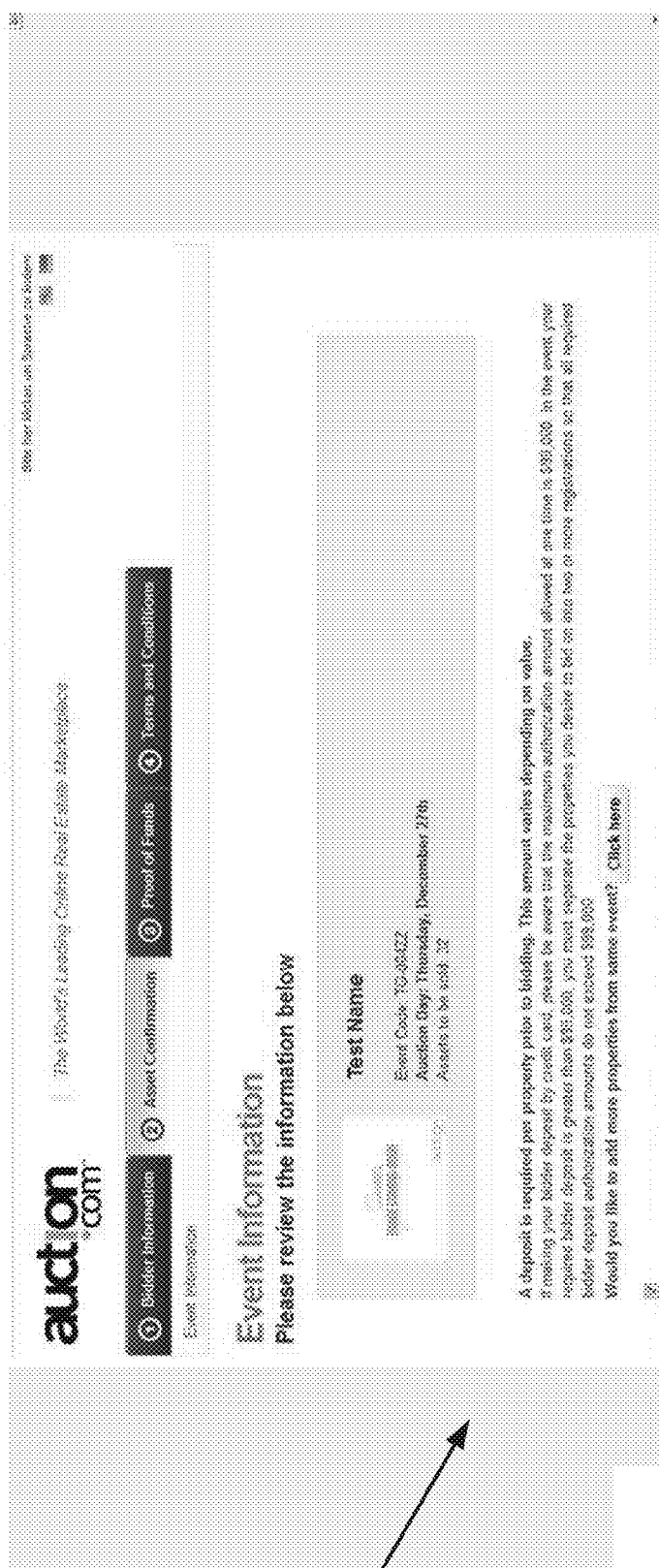
Figure 6D:
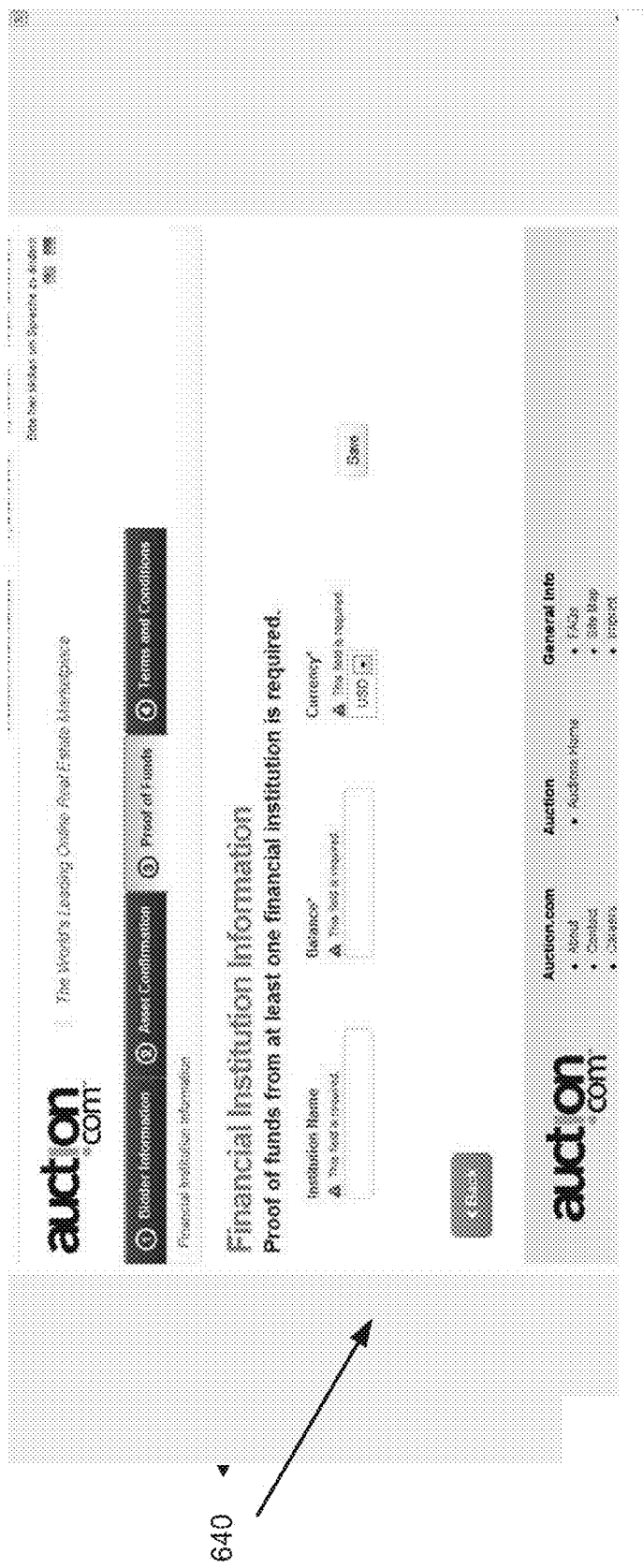

FIG. 6A through FIG. 6D illustrate a sample set of user interfaces and flow process that can be followed by a registrant that is acting as a seller. FIG. 6A illustrates an interface 610 that requests the user to specify input as to what type of seller that registrant is. The selection of the seller-type can determine what additional requirements are needed from the user. In particular, the additional requirements can be based on legal requirements of the pertinent geographic jurisdiction (e.g., country or locality where the asset is). FIG. 6B illustrates an interface 620 that specifies the documentation requirements from the seller. The requirement can be based on locality (e.g., "Germany") and seller-type ("investors who bid on their own behalf"). FIG. 6C and FIG. 6D each illustrate interfaces 630, 640 which prompt the user for information and other requirements (e.g., documentation) based on the user type.

Interactive Computing Environment for Auctions

Figure 7:
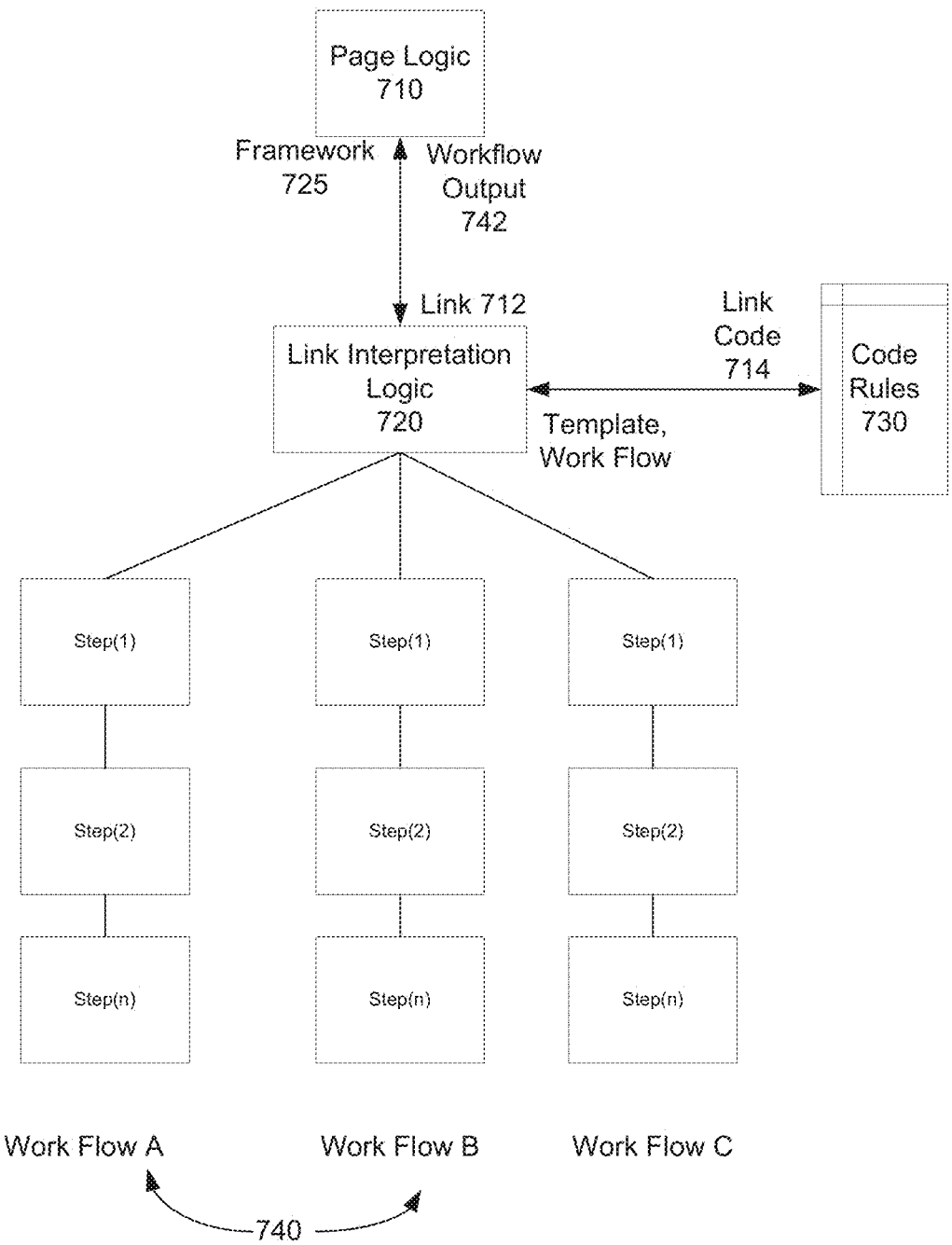
FIG. 7 illustrates a system for implementing an interactive computing environment through use of a server, according to an embodiment.

FIG. 7 illustrates a system for implementing an interactive computing environment through use of a server, according to an embodiment. As an example, an interactive computing environment resulting from implementation of an embodiment of FIG. 7 can correspond to an online auction environment. In one embodiment, participants of an online auction interact with page logic, such as user interface features provided on a webpage. The users can, for example, select an activity category (e.g., foreclosure sales).

According to an embodiment, the page logic is part of a framework that provides links which are encoded to designate workflows and sequences. The user's selection of the category activity, for example, can result in a link 712 that includes an embedded code element 714. Link interpretation logic 720 can parse the code element 714 from the link 712, and reference the code element with a set of code rules 730. The code rules 730 can match the code element 714 of the link 712 with a specific workflow 740. The selection of the workflow 740 can specify one workflow over one or more possible workflows. Each workflow can include a sequence or process in which multiple actions are performed, either automatically or in response to user input. An output 742 from performance of some or all of the steps of the workflow can be generated and provided to the page logic 710 along with the framework 725. In this way, the framework 725 can be used with outputs from one or more steps of a workflow. The server response to the coded URL can also include directing the page logic 710 to a dynamically constructed web page that includes an output of the workflow.

Role-Based Permissions

According to some embodiments, a role-based permission paradigm is utilized by system 100, 200 in order to enable various participants to act with a particular set of permissions. Embodiments recognize that some persons, for example, can occupy multiple roles in an online auction system. For example, an individual can be both buyer and seller. Rather than grant permissions by individual, some embodiments described herein assign individuals to roles, and provide permissions to roles.

Figure 8:
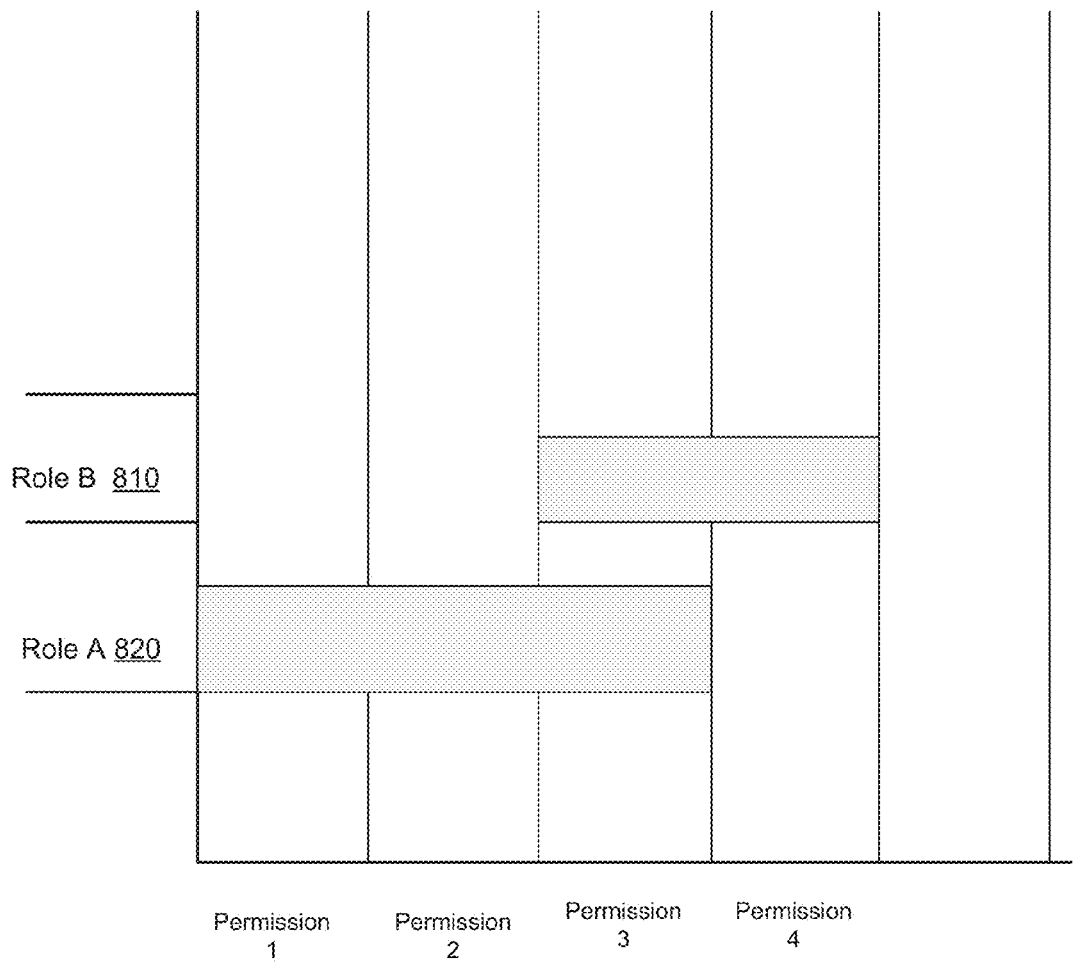
FIG. 8 illustrates an example of a role-based permission paradigm, according to one or more embodiments.

FIG. 8 illustrates an example of a role-based permission paradigm, according to one or more embodiments. In FIG. 8, for example, an individual is assigned two roles (e.g., bidder and seller). The Role A 810 can be associated with three permissions (Permission 1 . . . Permission 3; e.g., view bidding history of property for sale, view catalog). The Role B 820 can be associated with two permission (Permissions 3, 4; e.g., view catalog, make bids).

In one embodiment the total number of permissions that are granted to the person with Roles A and B includes the superset of permissions for Roles A and B; —e.g., Permissions 1-4. In a variation, the total number of permissions that are granted to the person with the Roles A and B includes the restrictive set of permissions for Roles A and B; e.g., Permission 3.

Embodiments described herein contemplate the use of various kinds of user interfaces. One type of user interface that can be provided includes a dashboard, which is a dynamic interface that can optionally be provided as a widget. One or more embodiments provide for use of dashboards to provide real-time information to users and/or administrators of an auction system such as described by any of the embodiments provided herein.

Dashboard

Figure 9:
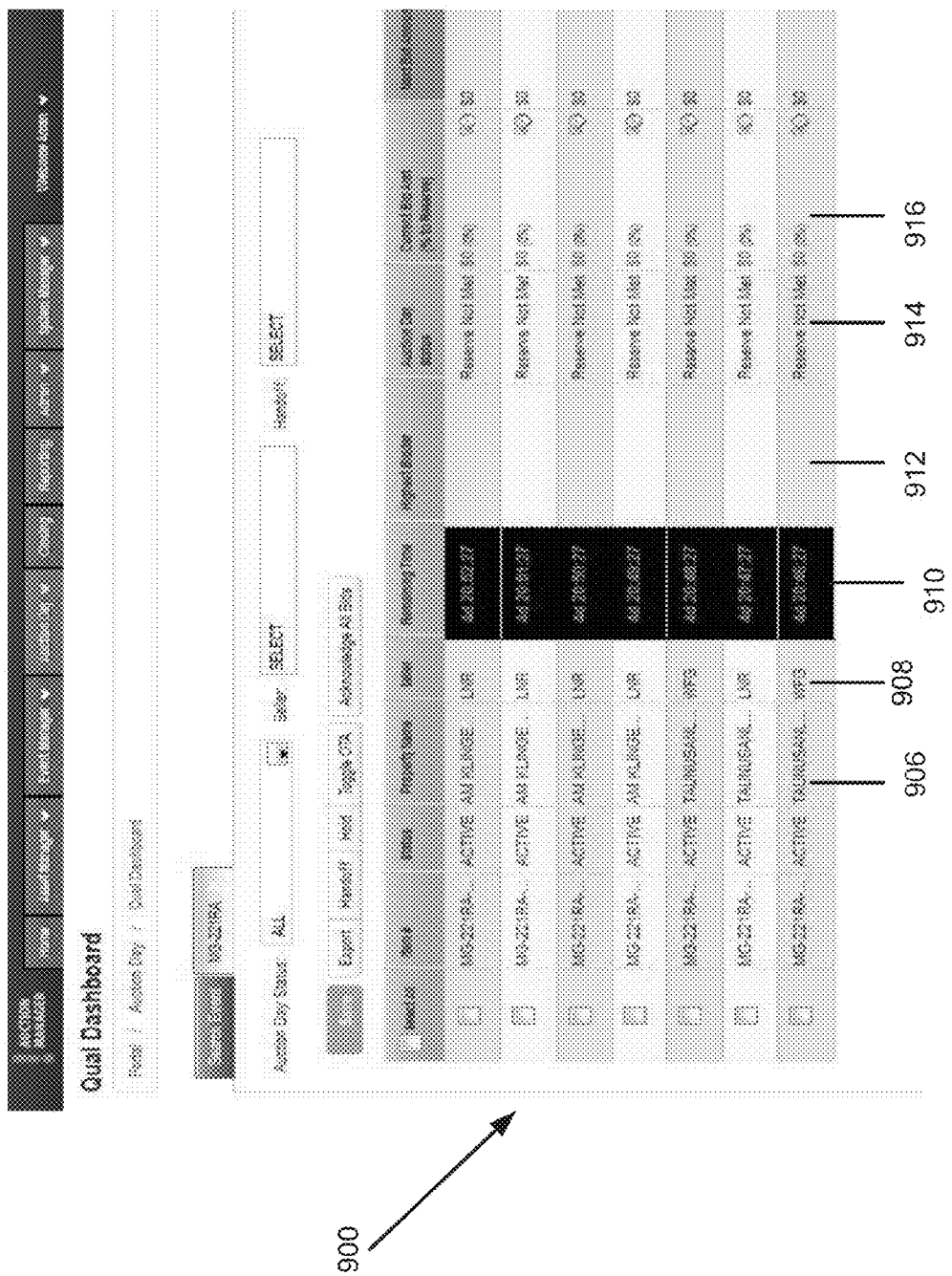
FIG. 9 illustrates a dashboard presentation for displaying auction information for multiple assets, according to an embodiment.

FIG. 9 illustrates a dashboard presentation for displaying auction information for multiple assets, according to an embodiment. A presentation such as shown with an example of FIG. 9 can be implemented using a system such as described with FIG. 1, or with a system such as described with an example of FIG. 2.

With reference to FIG. 9, a dashboard 900 can be generated to display information for assets provided with an auction system such as described by FIG. 1 or FIG. 1. Each asset can be identified by an identifier 902 and displayed with its status information 904 (e.g., pre-auction, active or in auction, closed). The property name 906 may refer to a street address, parcel number and/or short name listing. An identifier 908 for a seller of the asset can also be provided. The time 910 until the auction is closed can be displayed as well. Additional information that may be displayed includes a column 912 to identify the highest bidder, and a status column 914 to display whether the reserve has been met are not met. The highest bid amount may also be provided in the dashboard.

The particular configuration of dashboard 900 may be based on the role or permissions of the year of the dashboard. An administrator may see information that is not available to, for example, the bidders. For example, the dashboard 900 may be configured for display to an administrator, and be provided with a column 916 that displays how close the current bidding is to the reserved price. For users that are bidders, the dashboard may omit any information that would facilitate the bidder in determining what the reserve price is. The dashboard 900 can also display a column 918 to indicate what a next bid amount may be based on, for example, last bid and pre-determined bid increment size.

In this way, the dashboard 900 can display real-time status information for a variety of auctions in progress, as well as for other assets that are or were available through an auction system. Bidders can, for example, use a dashboard to track multiple assets at one time. Similarly, a seller can use a dashboard to track his or her items, as well as other items the seller selects to view a comparison. The administrator can see information that others may not have privy to (e.g., the actual reserve price). Numerous other variations can be made to the dashboard, depending on the role or permission of the person being provided to dashboard.

Computer System

Figure 10:
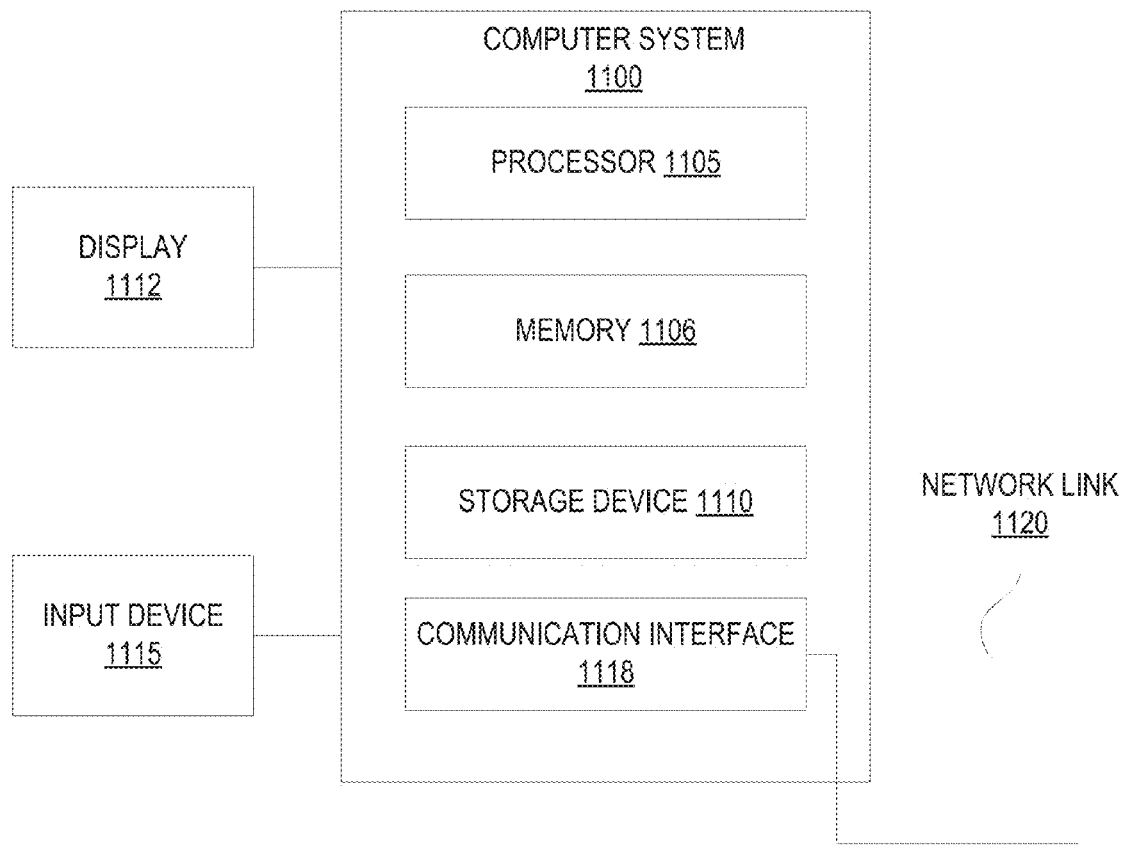
FIG. 10 is a block diagram that illustrates a computer system upon which embodiments described herein may be implemented.

FIG. 10 is a block diagram that illustrates a computer system upon which embodiments described herein may be implemented. For example, in the context of FIG. 1, system 100 may be implemented using one or more servers such as described by FIG. 10.

In an embodiment, computer system 1100 includes processor 1105, memory 1106 (including non-transitory memory), storage device 1110, and communication interface 1118. Computer system 1100 includes at least one processor 1105 for processing information. Computer system 1100 also includes a main memory 1106, such as a random access memory (RAM) or other dynamic storage device, for storing information and instructions to be executed by processor 1105. Main memory 1106 also may be used for storing temporary variables or other intermediate information during execution of instructions to be executed by processor 1105. Computer system 1100 may also include a read only memory (ROM) or other static storage device for storing static information and instructions for processor 1105. A storage device 1110, such as a magnetic disk or optical disk, is provided for storing information and instructions. The communication interface 1118 may enable the computer system 1100 to communicate with one or more networks through use of the network link 1120 (wireless or wireline).

Computer system 1100 can include display 1112, such as a cathode ray tube (CRT), a LCD monitor, and a television set, for displaying information to a user. An input device 1115, including alphanumeric and other keys, is coupled to computer system 1100 for communicating information and command selections to processor 1105. Other non-limiting, illustrative examples of input device 1115 include a mouse, a trackball, or cursor direction keys for communicating direction information and command selections to processor 1105 and for controlling cursor movement on display 1112. While only one input device 1115 is depicted in FIG. 10, embodiments may include any number of input devices 1115 coupled to computer system 1100.

Embodiments described herein are related to the use of computer system 1100 for implementing the techniques described herein. According to one embodiment, those techniques are performed by computer system 1100 in response to processor 1105 executing one or more sequences of one or more instructions contained in main memory 1106. Such instructions may be read into main memory 1106 from another machine-readable medium, such as storage device 1110. Execution of the sequences of instructions contained in main memory 1106 causes processor 1105 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. An online auction system comprising:
    a set of memory resources that store auction data;
    one or more processors that implement multiple instances of a set of logical components to concurrently and independently provide multiple auction services, each instance of the set of logical components providing one of multiple auction services by performing operations that include:
        receiving information from a seller that identifies an asset for auctioning;
        standardizing the information provided by the seller;
        verifying that the asset can be auctioned based on the information provided by the seller;
        storing at least the standardized information as auction data with the set of memory resources;
        associating, in the set of memory resources, one of a plurality of auction states with the information stored for the asset, the plurality of auction states including a pre-auction state which identifies the asset prior to being auctioned, an auction in progress state in which an auction for the asset is being conducted, and a post-auction state in which the auction for the asset is complete;
        providing information about the asset for viewing and searching for a population of potential bidders when the asset is in the pre-auction state;
        implementing the auction for the asset when the asset is in the auction in progress state;
    wherein the multiple auction services include a first auction service hosted from a first domain by a first host and a second auction service hosted from a second domain by a second host; and
    wherein the one or more processors dynamically adjust an amount of processing resources from the one or more processors for providing one or more of the multiple instances of logical components based on a demand level of one or more of the multiple auction services.

2. The online auction system of claim 1, wherein the one or more processors store a first set of standardized auction information received through implementation of a first instance of the set of logical components in a first partition of the memory resources, and a second set of standardized auction information received through implementation of a second instance of the set of logical components in a second partition of the set of memory resources.

3. The online auction system of claim 1, wherein the one or more processors generate one or more of the multiple instances in response to a request from a third-party auction host.

4. The online auction system of claim 1, wherein the demand level includes an activity level of one or more of the multiple auction services.

5. The online auction system of claim 1, wherein the one or more processors concurrently and independently provide the multiple auction services by branding each of the multiple auction services for a different auction provider.

6. The online auction system of claim 1, wherein the one or more processors concurrently and independently provide the multiple auction services by hosting each of the multiple auction services on a different domain.

7. The online auction system of claim 1, wherein the one or more processors concurrently and independently provide multiple auction services by retrieving auction data from the first auction host, and physically and logically positioning the memory resources based on the auction data from the first auction host.

8. The online auction system of claim 1, wherein the one or more processors physically partition the set of memory resources so that at least a first portion of the set of memory resources is dedicated for only the first auction service and a second portion of the set of memory resources is dedicated only for the second auction services.

9. The online auction system of claim 1, wherein the one or more processors implement the auction for the first auction service under a first set of auction rules, and implement the auction for the second auction service under a second set of auction rules.

10. The online auction system of claim 1, wherein the asset corresponds to a real property item, and wherein the one or more processors standardize the information by determining a type for the seller.

11. The online auction system of claim 1, wherein the asset corresponds to a real property item, and wherein the one or more processors standardize the information by standardizing a format of a street address for the real property item.

12. The online auction system of claim 1, wherein the asset corresponds to a real property item, and wherein the one or more processors verify the information by verifying an address for the real property item.

13. The online auction system of claim 1, wherein the asset corresponds to a real property item, and wherein the one or more processors verify the information by determining a name of an owner for the real property item from an independent source other than the seller.

14. A method for operating an online auction system, the method being implemented by one or more processors and comprising:
    storing auction data;
    implementing multiple instances of a set of logical components to concurrently and independently provide multiple auction services;
    wherein each set of logical components provides one of multiple auction services by:
        receiving information from a seller that identifies an asset for auctioning;
        standardizing the information provided by the seller;

verifying that the asset can be auctioned based on the information provided by the seller;
storing at least the standardized information as auction data with the set of memory resources;
associating, in the set of memory resources, one of a plurality of auction states with the information stored for the asset, the plurality of auction states including a pre-auction state which identifies the asset prior to being auctioned, an auction in progress state in which an auction for the asset is being conducted, and a post-auction state in which the auction for the asset is complete;
providing information about the asset for viewing and searching for a population of potential bidders when the asset is in the pre-auction state;
implementing the auction for the asset when the asset is in the auction in progress state;
wherein the multiple auction services include a first auction service hosted from a first domain by a first host and a second auction service hosted from a second domain by a second host; and
wherein the method further includes dynamically adjusting an amount of processing resources from the one or more processors for providing one or more of the multiple instances of logical components based on a demand level of one or more of the multiple auction services.

* * * * *